US00RE42339E

(19) United States
(12) Reissued Patent
Brice

(10) Patent Number: US RE42,339 E
(45) Date of Reissued Patent: May 10, 2011

(54) COMPETITIVE SWIMMING STARTING SYSTEM

(76) Inventor: Keith Brice, Lakeport, CA (US)

(21) Appl. No.: 12/661,614

(22) Filed: Mar. 19, 2010

Related U.S. Patent Documents

Reissue of:
(64) Patent No.: 7,193,167
Issued: Mar. 20, 2007
Appl. No.: 10/152,530
Filed: May 21, 2002

U.S. Applications:
(63) Continuation-in-part of application No. 29/117,425, filed on Jan. 21, 2000, now Pat. No. Des. 464,699.

(51) Int. Cl.
*F21V 5/00* (2006.01)

(52) U.S. Cl. ..... 362/318; 4/496; 4/504

(58) Field of Classification Search ..... 200/52 R, 200/85 R, 293, 308–310; 4/496–504, 631, 4/637; 362/318
See application file for complete search history.

(56) References Cited

U.S. PATENT DOCUMENTS 3,665,452 A 5/1972 MacCreadie
3,678,496 A 7/1972 Stalp
3,916,214 A 10/1975 Coble, Jr. et al.
3,944,763 A 3/1976 Beierwaltes
3,955,076 A 5/1976 Shaw
D240,220 S 6/1976 Meyer
D240,811 S 8/1976 Beall, Jr.
4,117,283 A 9/1978 Hurzeller et al.
4,134,583 A 1/1979 Davidson
4,194,101 A 3/1980 Berseth
4,475,016 A 10/1984 Berger
4,780,085 A 10/1988 Malone
4,935,733 A 6/1990 Munekata
5,920,921 A 7/1999 Poole
5,977,493 A 11/1999 Tanaka
6,523,188 B1 2/2003 Kiefer et al.

*Primary Examiner* — Kyung Lee

(57) ABSTRACT

A competitive swimming starting system for producing faster starts of competitive swimmers after the start of the race has been signaled. The competitive swimming starting system may include a platform structure for resting on a surface adjacent to a pool, and a light for illuminating to indicate a starting signal for a swimming race. In one embodiment of the invention, the light is mounted on the platform structure in the view of a person positioned on the starting platform structure. The present invention also contemplates a method of signaling the start of a swimming race, which includes providing a competitive swimming starting platform structure positioned adjacent to a pool, providing a light proximate to the starting platform structure in a location in the view of a person positioned on the starting platform structure, and illuminating the light to signal a start of a swimming race.

27 Claims, 9 Drawing Sheets

COMPETITIVE SWIMMING STARTING SYSTEM

Matter enclosed in heavy brackets [ ] appears in the original patent but forms no part of this reissue specification; matter printed in italics indicates the additions made by reissue.

REFERENCE TO RELATED APPLICATION

This application is a continuation-in-part of design Pat. application No. 29/117,425, filed Jan. 21, 2000 now U.S. Pat. No. Des. 464,699.

BACKGROUND OF THE INVENTION

1. Field of the Invention

The present invention relates to swimming starting platforms and more particularly pertains to a new competitive swimming starting system for producing faster starts of competitive swimmers after the start of the race has been signaled.

2. Description of the Prior Art

The use of starting platforms is known for supporting participants prior to the start of a swimming race. Conventionally, the swimming race is initiated by producing a sound, such as, for example, the firing of a starting gun or the sounding of a starting tone, that is recognized by the participants of the race as the signal to jump into the pool (if not already in the pool) and to begin swimming. Understandably, a measure of delay is introduced into the start by the time that is required for the sound to be issued from the sound source (such as the starting gun or a speaker) to the ears of the participants, while the timing devices recording times for the swimmers has begun at the time the sound was issued. Depending upon the positioning of the sound source, none of the participants is given a significant advantage in the race with respect to each other. However, the recorded times for each of the participants may be affected due to the fact that the timing devices start at the time of the issuance of the sound from the sound source while the participants must "wait" for the sounds waves to reach each of them to begin the race. A small, but appreciable, amount of time is added to the individual times of the participants in a sport where times may be measured in the hundredths of seconds. Further, if the sound source is located significantly closer to some participants than other participants, the closer participants may be given a slight advantage in starting the race.

Due to the highly competitiveness of the sport in which rankings and records are typically based on race completion times, it is therefore desirable to employ a starting system that is able to produce faster starts for competitive swimmers after the start of the race has been signaled.

SUMMARY OF THE INVENTION

In view of the foregoing disadvantages inherent in the known types of starting systems now employed in the prior art, the present invention provides a new race starting system which may employ a competitive swimming starting platform to produce faster starts of competitive swimmers after the start of the race has been signaled.

To attain this, the present invention generally comprises a platform structure for resting on a surface adjacent to a pool, and a light for illuminating to indicate a starting signal for a swimming race. In one embodiment of the invention, the light is mounted on the platform structure in the view of a person positioned on the starting platform structure. In one embodiment of the invention, an inclined surface is positioned on a support of the platform structure for providing a bracing surface for the feet, or a portion of the feet, of a swimmer for a start.

The present invention also contemplates a method of signaling the start of a swimming race, which includes providing a competitive swimming starting platform structure positioned adjacent to a pool, providing a light proximate to the starting platform structure in a location in the view of a person positioned on the starting platform structure, and illuminating the light to signal the start of a swimming race.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One of the most significant advantages of the present invention is to enable faster starts in a competitive swimming race by swimmers after the start of the race has been signaled for reducing the times for completion of the race distance by the swimmers.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
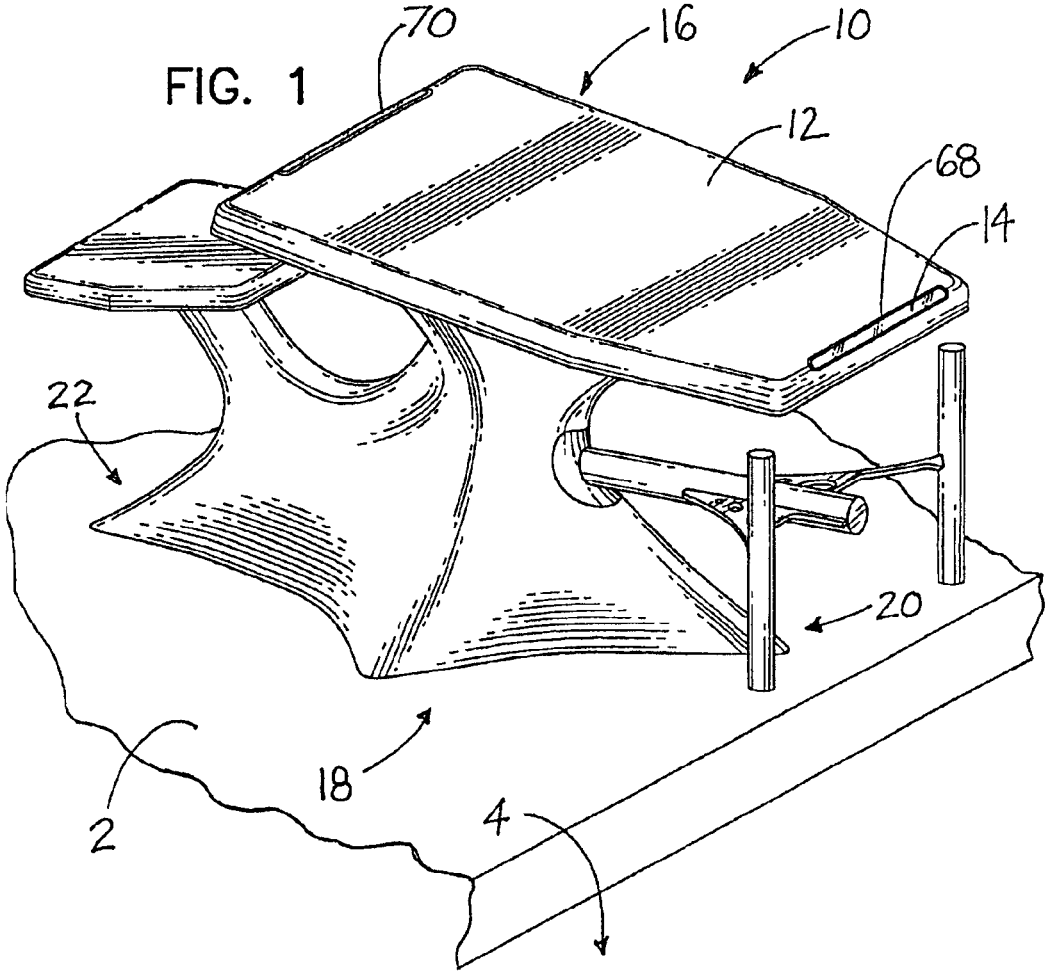
FIG. 1 is a schematic perspective view of a new competitive swimming starting system according to the present invention.
Figure 2:
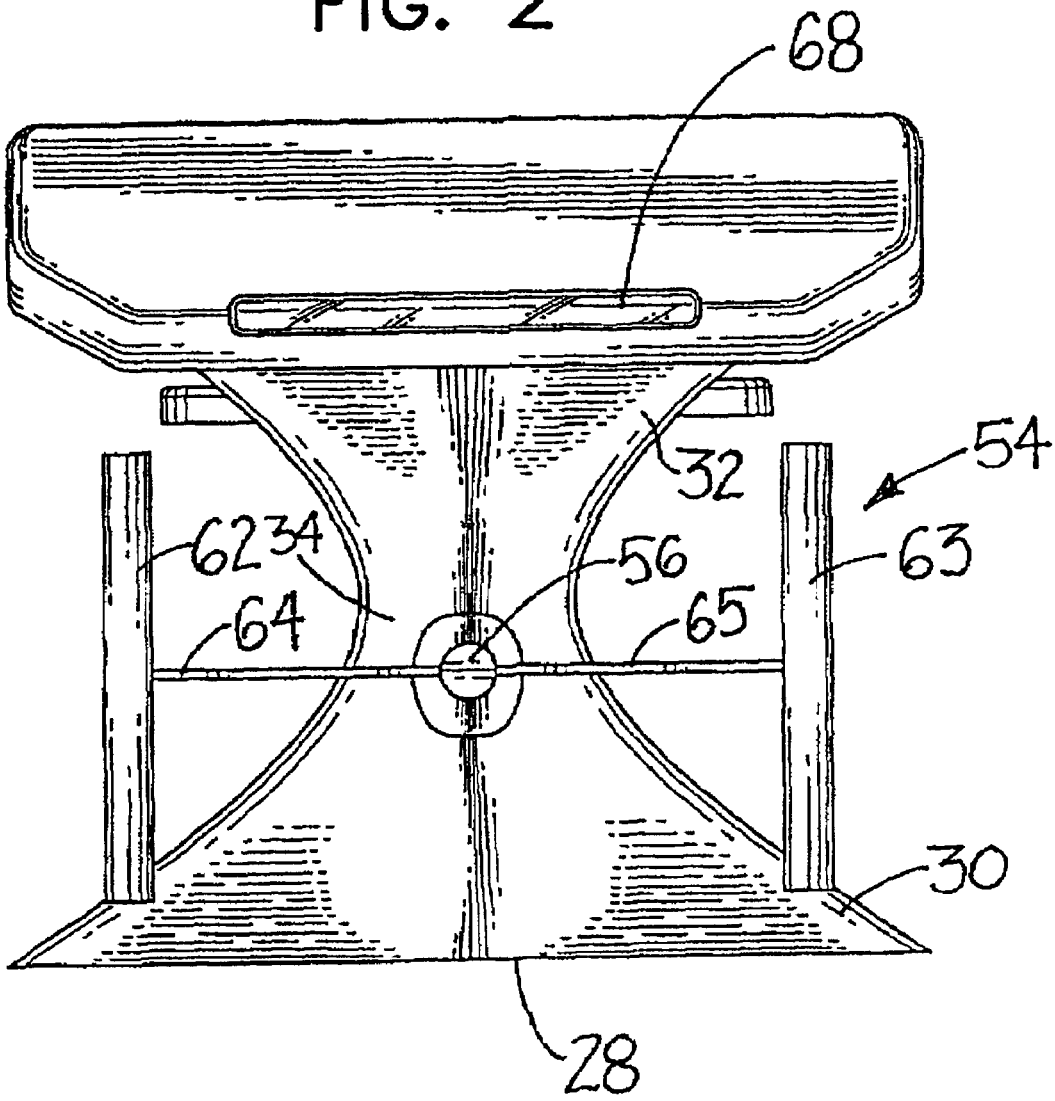
FIG. 2 is a schematic front view of the present invention.
Figure 3:
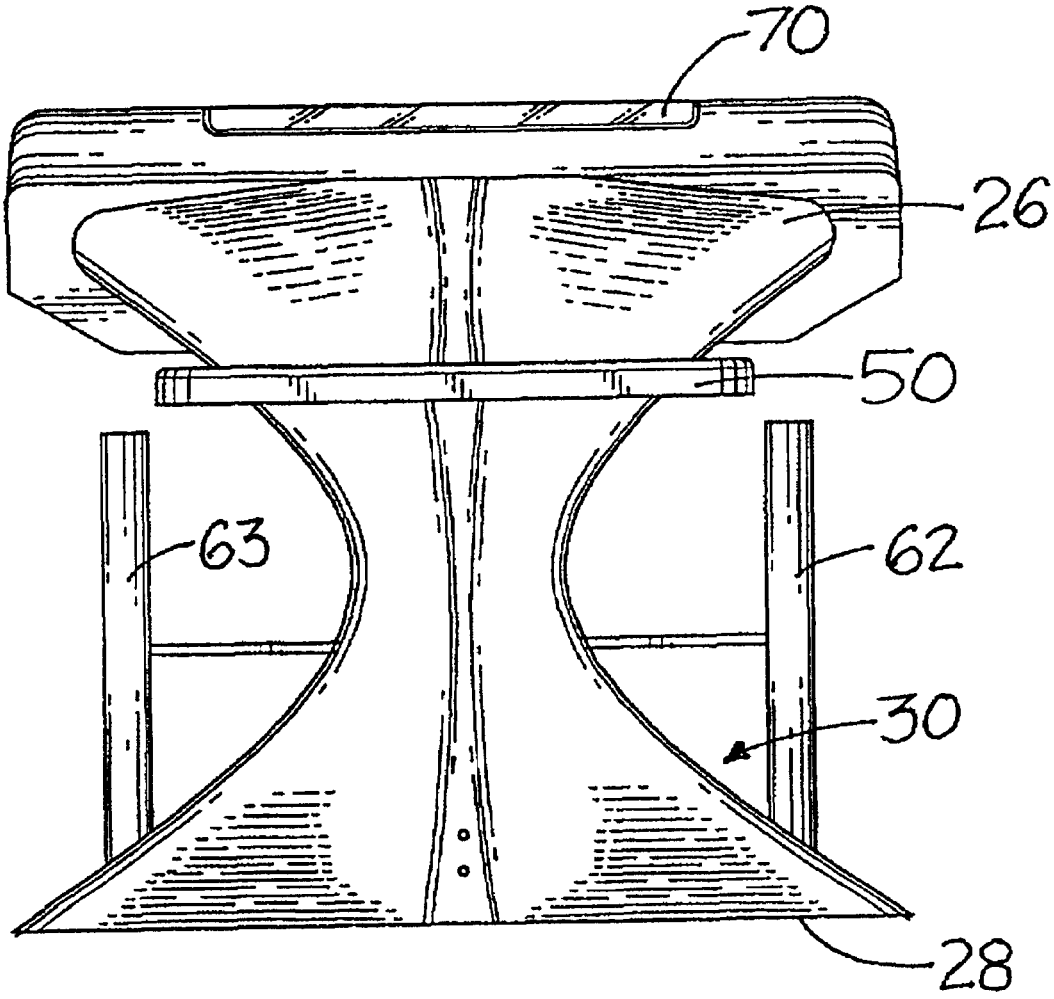
FIG. 3 is a schematic rear view of the present invention.
Figure 4:
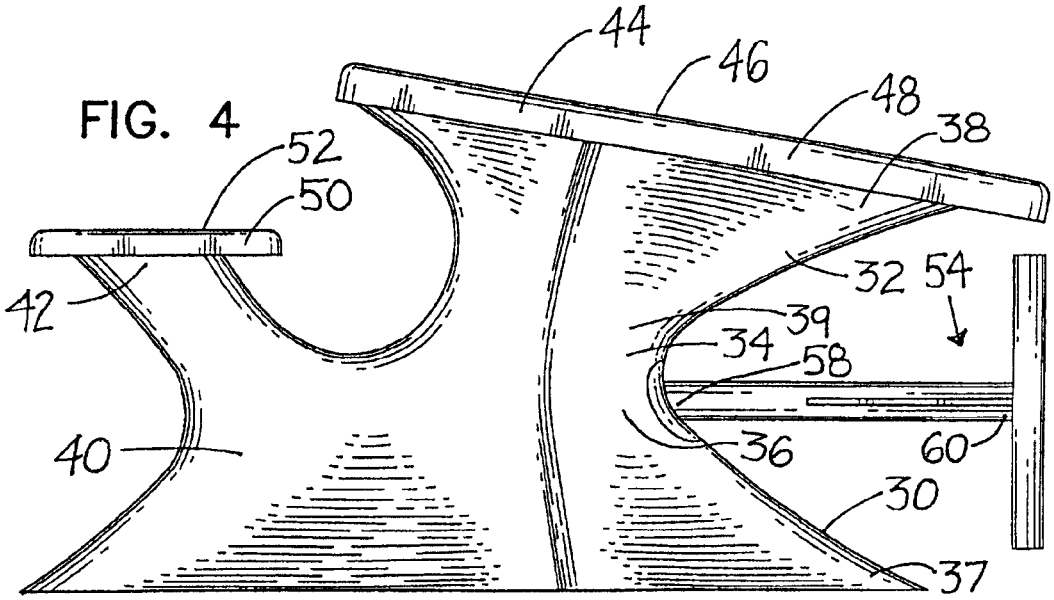
FIG. 4 is a schematic left side view of the present invention.
Figure 5:
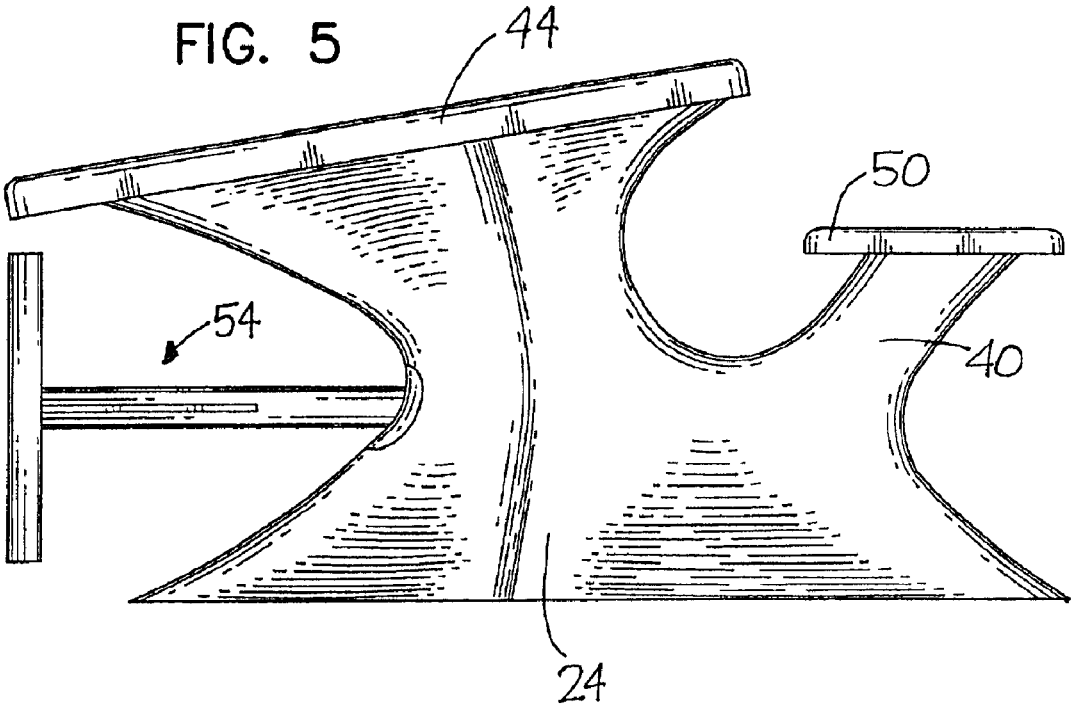
FIG. 5 is a schematic right side view of the present invention.
Figure 6:
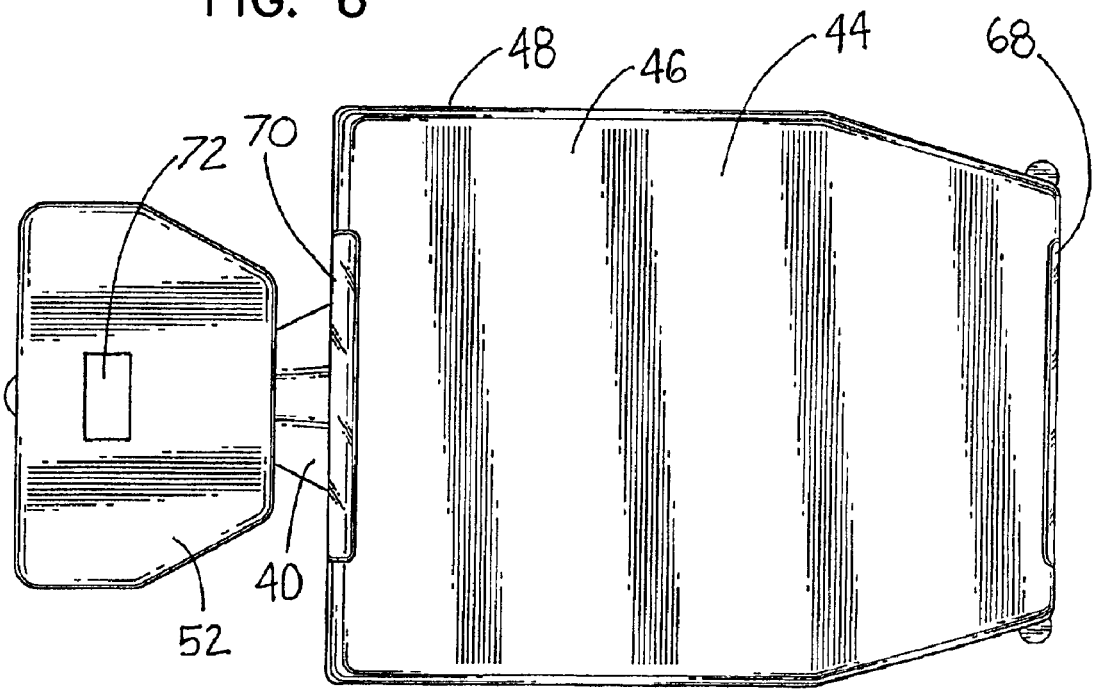
FIG. 6 is a schematic top view of the present invention.
Figure 7:
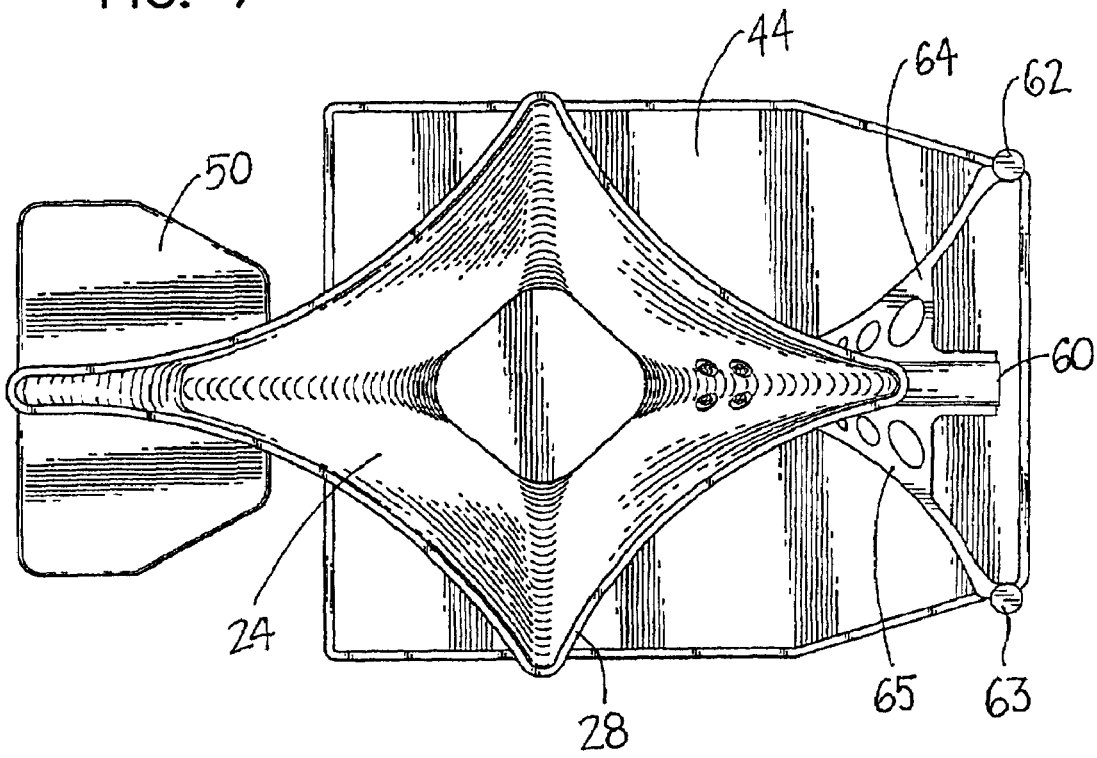
FIG. 7 is a schematic bottom view of the present invention.
Figure 8:
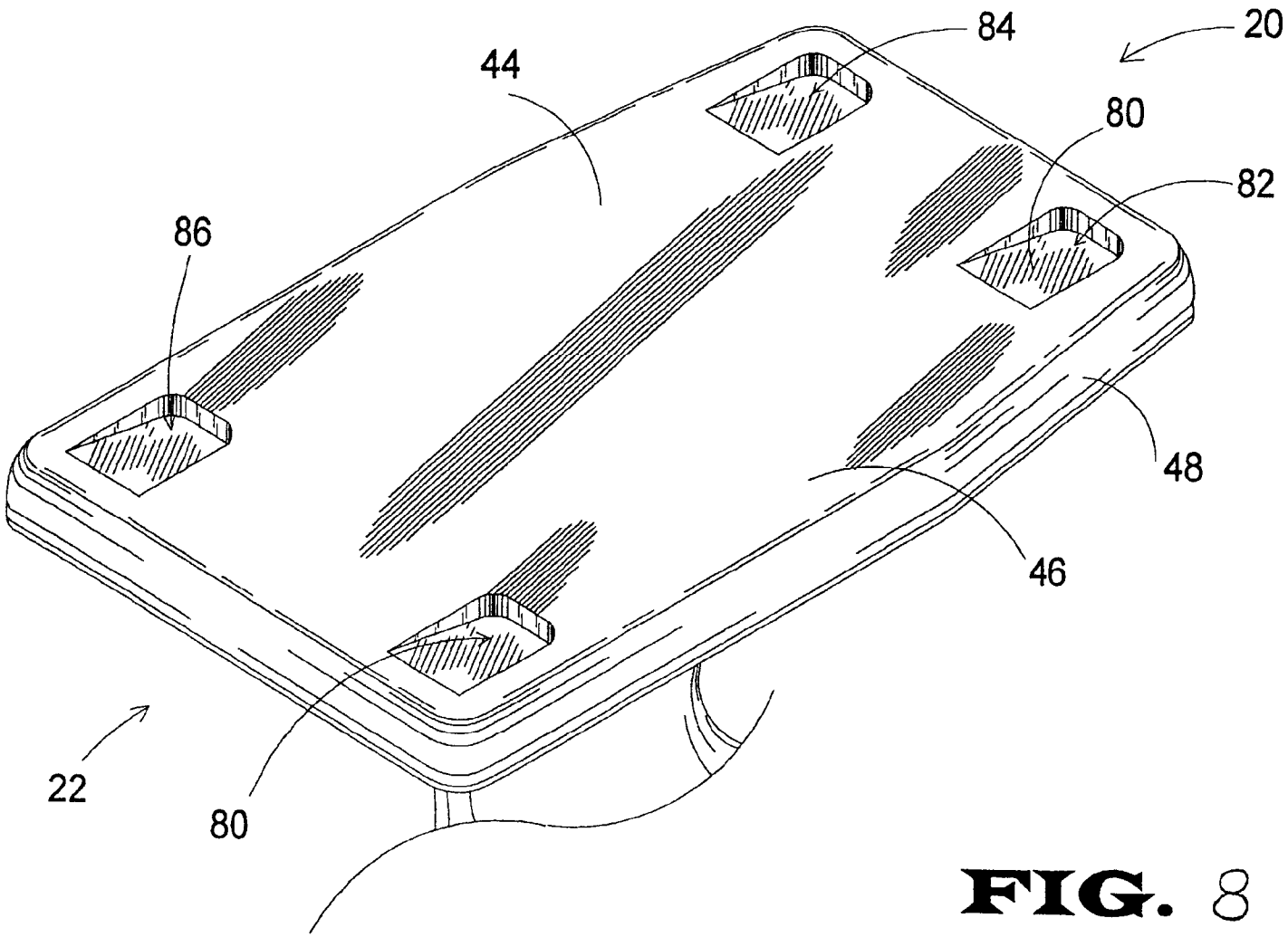
FIG. 8 is a schematic perspective view of the present invention showing an optional support of the platform structure having
Figure 9:
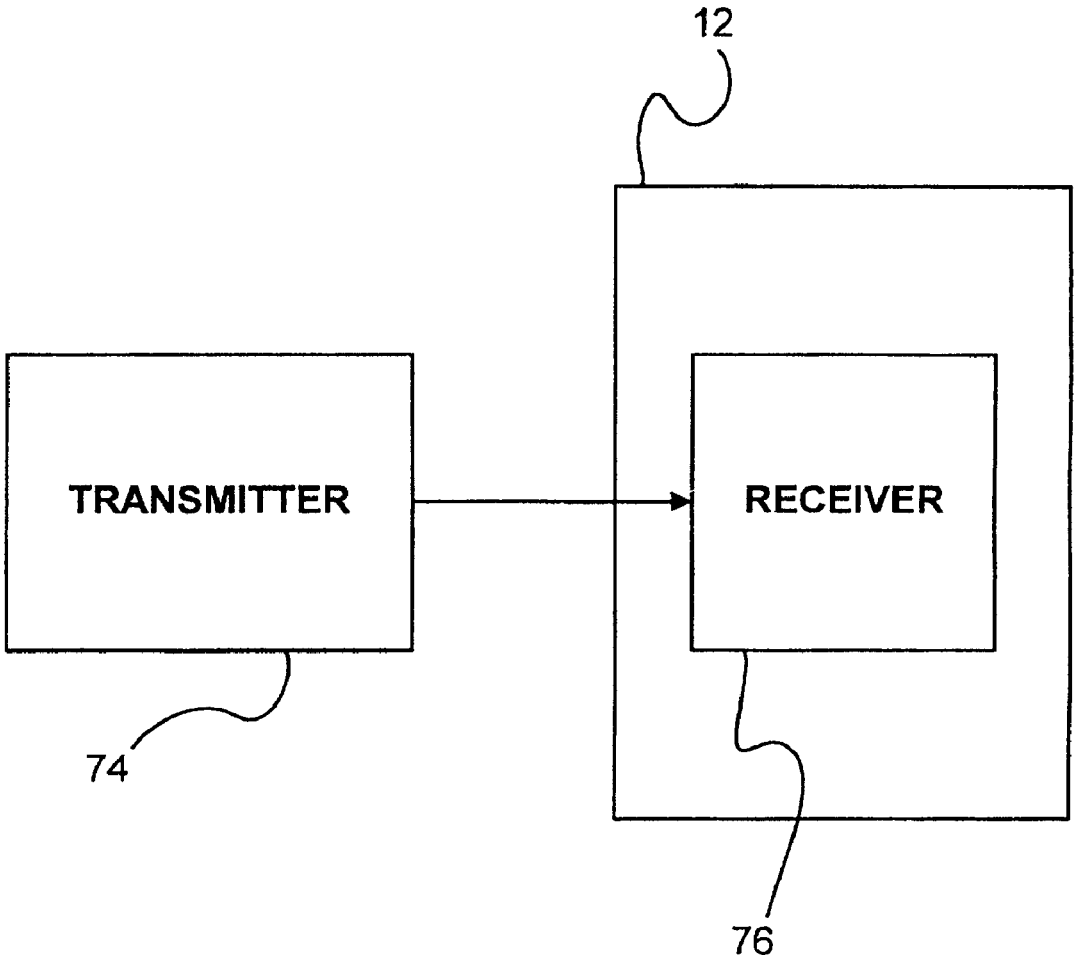
FIG. 9 is a schematic diagram of the present invention.

With reference now to the drawings, and in particular to FIGS. 1 through 9 thereof, a new competitive swimming starting system embodying the principles and concepts of the present invention and generally designated by the reference numeral 10 will be described.

As best illustrated in FIGS. 1 through 9, the competitive swimming starting system 10 generally comprises a platform structure 12 and a light 14 for signaling the start of a swimming race.

The platform structure 12 of the swimming starting system 10 is suitably rested or mounted on a surface 2 adjacent to a pool 4. The platform structure 12 has a top 16, a bottom 18 which may be rested on the surface 2, a front 20 for orienting toward the pool 4, and a rear 22 for orienting or directing away from the pool 4.

The platform structure 12 may include a base 24. The base 24 has a top 26 and a bottom 28, and a central axis extends between the top and bottom of the base. One embodiment of the base 24 of the platform structure includes a lower region 30, an upper region 32, and a middle region 34. The lower region 30 has a top 36 and a bottom 37 for positioning adjacent to the surface adjacent to the pool. The upper region 32 is located above the lower region 30, and has a top 38 and a bottom 39. The middle region 34 is positioned between the upper 32 and lower 30 regions, and connects the bottom 39 of the upper region 32 and the top 36 of the lower region.

In one embodiment of the base of the platform structure, the top 36 of the lower region 30 may have a relatively smaller cross sectional area than the bottom 37 of the lower region, and the bottom 37 of the lower region 30 may have a relatively smaller cross sectional area than the top 38 of the upper region 32.

In one embodiment of the invention, the base 24 includes a rear region 40 that extends rearwardly and generally upwardly from the lower region 30. The rear region 40 has a top 42. In the embodiment of the base that is illustrated in the drawings, the base has a horizontal cross sectional shape that resembles a cross, with a pair of longitudinally-extending lobes and a pair of laterally extending lobes.

The platform structure 12 of the invention may include a support 44 mounted on the base, and may be mounted on the upper region 32 on the base 24. The support 44 has an upper surface 46 on which the swimmer stands prior to the beginning of the race. The support 44 has a perimeter 48 extending downwardly from the upper surface 46.

A step 50 may be mounted on the base 24, and may be positioned rearwardly of the support 44. The step 50 may be mounted on the rear region 40 of the base 24, and may be mounted on the top 42 of the rear region. The step 50 has an upper surface 52.

Optionally, a backstroke arm structure 54 may be mounted on the front 20 of the platform structure 12, and may extend forwardly from the platform structure. One embodiment of the backstroke arm structure 54 includes a support member 56 that may extend forwardly from the front 20 of the platform structure 12. The support member 56 may be elongate and may have a rear end 58 mounted on the base 24 and a forward end 60 opposite of the rear end 58. The support member 56 may be substantially cylindrical, and may extend substantially horizontally when the bottom 18 of the platform structure 12 is rested on the surface adjacent to the pool. The backstroke arm structure 54 may also include a pair of gripping members 62, 63 mounted on the support member 56. Each of the gripping members 62, 63 may be elongate, and each of the gripping members may extend in a substantially vertical orientation when the platform structure 12 is rested on the surface 2 adjacent to the pool 4. The backstroke arm structure 54 may further include a pair of links 64, 65 that mount the gripping members 62, 63 on the support member 56. Each of the links 64, 65 extends between one of the gripping members 62, 63 and the support member 56.

A further significant feature of the invention is the light 68 for illuminating to indicate a starting signal. The light 68 may be mounted on the platform structure 12, and may be located on the platform structure in a position such that the light is visible to a person in a start position on the platform structure. The light 68 may be located on the front 20 of the platform structure 12. Additionally, or alternatively, a light 70 may be mounted on the rear of the platform structure. The light or lights may be mounted on the support 44, and the light 68 may be mounted on the front of the support, and the light 70 may be mounted on the rear of the support 44. The light 68, 70 may be located adjacent to the perimeter 48, and may be located adjacent to the upper surface 46, of the support 44. The light 68, 70 may extend laterally with respect to the platform structure. Optionally, a light 72 may be included on the step 50 of the platform structure, such as, for example, in a substantially central location on the step. It should be understood that one, two, three or more of the lights may be employed at various locations on the platform structure 12.

The invention may include suitable controls for controlling illumination of the light or lights, and the controls may include a transmitter 74 which may be located remote from the platform structure and a receiver 76 mounted on the platform structure. The receiver 76 may selectively cause power to be supplied to the light or lights when a trigger signal is received by the receiver from the transmitter. The transmitter 74 and receiver 76 may communicate by a wire, or may communicate wirelessly.

Optionally, the present invention may include an inclined surface 80 which is positioned on the support 44 of the platform structure 12 and which provides a bracing surface for the feet, or a portion of the feet, of the swimmer standing on the support. Significantly, the inclined surface 80 is oriented at an angle with respect to a plane of the upper surface 46 of the support 44 such that the inclined surface extends forwardly and downwardly to a greater degree than the upper surface of the support. In some embodiments of the invention, the angle of the inclined surface is approximately 30 degrees to approximately 60 degrees with respect to the upper surface. The inclined surface 80 may be formed on the support 44 of the platform structure 12. In one embodiment of the invention, a depression 82 is formed in the upper surface 52 and the inclined surface 80 forms a portion of the depression 82 in the upper surface. The inclined surface 80 may extend from the upper surface 46 at the angle into the depression 82. In one embodiment of the invention, a pair 82, 84 of the depressions are formed in the upper surface 46 of the support. The pair of depressions 82, 84 may be laterally separated with respect to each other on the support. Optionally, the pair of depressions 82, 84 may be located adjacent to a front edge of the support 44. As a further option, a second pair of depressions 86, 88 may be formed on the upper surface 46, and the second pair of depressions 86, 88 may be located adjacent to a rear edge of the support.

Another aspect of the invention contemplates a method of signaling the start of a swimming race. The method includes providing a competitive swimming starting platform structure positioned adjacent to a pool. Optionally, a plurality of the starting platform structures may be provided positioned adjacent to the pool for a plurality of competitors for a swimming competition. The method further includes providing a light proximate to the starting platform structure, which may include positioning the light in the view of a person positioned on the starting platform structure. The light may be provided on the starting platform structure, and may be integrated into the platform structure. Optionally, each of the plurality of starting platform structures may be provided with a light. The method may also include illuminating the light to signal a start of a swimming race, and may include illuminating the lights on each of the platforms simultaneously.

In one illustrative embodiment of the invention, the support may have a length of approximately 30 inches and a width of approximately 24 inches. The width of the support may taper narrower toward a front of the platform structure. The upper surface of the support may be angled downwardly from back to front at an angle in the range of approximately 15 to 25 degrees, although other angles of declination, or no declination at all, may be employed. Illustratively, the step may have a lateral width of approximately 16 inches, and may have a front to back length of approximately 10 inches.

Illustratively, the platform structure of the invention may be formed of any durable and strong material, and one preferred material comprises fiberglass, and may also include an aluminum subplate located at the bottom of the base of the platform structure.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A swimming race starting system for positioning adjacent to a pool, the system comprising:

a platform structure for resting on a surface adjacent to a pool, the platform structure having a top, a bottom, a front, and a rear; and a light for illuminating to indicate a starting signal for a swimming race;

wherein the light is mounted on the platform structure in a location such that the light is visible to a person positioned in a swimming race start position on the platform structure.

2. The system of claim 1 wherein the light is located on the front of the platform structure.

3. The system of claim 1 wherein the light is mounted on the rear of the platform structure.

4. The system of claim 1 wherein the platform structure includes a base and a support mounted on the base, the support having an upper surface for standing on by a person in a swimming race position.

5. The system of claim 4 wherein the light is mounted on the support.

6. The system of claim 4 wherein the light is mounted on a front of the support.

7. The system of claim 4 wherein the light is mounted on a rear of the support.

8. The system of claim 4 wherein the support has a perimeter extending downwardly from the upper surface, the light being located adjacent to the perimeter.

9. The system of claim 4 wherein the light is located adjacent to the upper surface of the support.

10. The system of claim 4 wherein the light extends laterally with respect to the platform structure.

11. The system of claim 4 additionally comprising a step mounted on the base, the step having an upper surface and being positioned rearwardly of the support.

12. The system of claim 4 wherein an inclined surface is positioned on the support of the platform structure, the inclined surface being oriented at an angle with respect to a plane of the upper surface of the support.

13. The system of claim 12 wherein a depression is formed in the upper surface and the inclined surface forms a portion of the depression in the upper surface.

14. The system of claim 1 including at least two said lights mounted on the platform.

15. The system of claim 1 additionally comprising control means for controlling illumination of the light.

16. The system of claim 15 wherein the control means includes a transmitter located remote from the platform structure and a receiver mounted on the platform structure, the receiver selectively causing power to be supplied to the light when a trigger signal is received by the receiver from the transmitter.

17. The system of claim 16 wherein the transmitter and receiver communicate by a wire.

18. The system of claim 16 wherein the transmitter and receiver communicating wirelessly.

[19. The system of claim 1 additionally comprising a backstroke arm structure mounted on the front of the platform structure, the backstroke arm structure extending forwardly from the platform structure.]

20. The system of claim 1 wherein the platform structure includes a base and a support mounted on the base, the support having an upper surface for standing on by a person in a swimming race position;

wherein the light comprises a plurality of lights, one of the plurality of lights being mounted on a front of the support and one of the plurality of lights being mounted on a rear of the support.

21. The system of claim 1 wherein the platform structure is configured so that the light is positioned above the surface when the bottom of the platform is rested on the surface.

22. The system of claim 1 wherein the platform structure is configured so that the light is positioned adjacent to the body of the person when the person is standing on the top of the platform structure.

23. The system of claim 1 wherein the platform structure is configured so that the light is positioned outside the pool when the bottom of the platform is rested on the surface adjacent to the pool.

[24. A swimming starting system comprising:

a platform structure for resting on a surface adjacent to a pool, the platform structure having a top, a bottom, a front, and a rear, the platform structure comprising:

a base, the base having a top and a bottom and a central axis extending between the top and bottom of the base, the base comprising:

a lower region having a bottom for positioning adjacent to the surface adjacent to the pool and a top, the top of the lower region having a relatively smaller cross sectional area than the bottom of the lower region;

an upper region located above the lower region, the upper region having a top and a bottom, the bottom of the lower region having a relatively smaller cross sectional area than the top of the upper region;

a middle region positioned between the upper and lower regions, the middle region connecting the bottom of the upper region and the top of the lower region; and a rear region extending rearwardly and upwardly from the lower region, the rear region having a top;

a support mounted on the base, the support being mounted on the upper region of the base, the support having an upper surface, the support having a perimeter extending downwardly from the upper surface;

a step mounted on the base, the step being positioned rearwardly of the support, the step being mounted on the rear region of the base, the step being mounted on the top of the rear region, the step having an upper surface;

a backstroke arm structure mounted on the front of the platform structure, the backstroke arm structure extending forwardly from the platform structure, the backstroke arm structure comprising:

a support member extending forwardly from the platform structure, the support member being mounted on the front of the platform structure, the support member being elongate and having a rear end mounted on the base and a forward end opposite of the rear end, the support member extending substantially horizontally when the bottom of the platform structure is rested on the surface adjacent to the pool;

a pair of gripping members mounted on the support member, each of the gripping members being elongate, each of the gripping members extending in a substantially vertical orientation when the platform structure is rested on the surface adjacent to the pool; and a pair of links mounting the gripping members on the support member, each of the links extending between one of the gripping members and the support member;

a light for illuminating to indicate a starting signal, the light being mounted on the platform structure in a position such that the light is visible to a person in a start position on the platform structure, the light being located on the front of the platform structure, the light being mounted on the rear of the platform structure, the light being mounted on the support, the light being mounted on the front of the support, the light being mounted on the rear of the support, the light being located adjacent to the perimeter, the light being located adjacent to the upper surface, the light extending laterally with respect to the platform structure, the light flashing to indicate a start of a swimming race; and control means for controlling illumination of the light, the control means including a transmitter located remote from the platform structure and a receiver mounted on the platform structure, the receiver selectively causing power to be supplied to the light when a trigger signal is received by the receiver from the transmitter, the transmitter and receiver communicating by a wire, the transmitter and receiver communicating wirelessly;

wherein an inclined surface is positioned on the support of the platform structure, the inclined surface being oriented at an angle with respect to a plane of the upper surface of the support, the angle being approximately 30 degrees to approximately 60 degrees, the inclined surface being formed on the support of the platform structure, a depression being formed in the upper surface and the inclined surface forming a portion of the depression in the upper surface, the inclined surface extending from the upper surface at the angle, a pair of the depressions being formed in the upper surface of the support, the pair of depressions being laterally separated with respect to each other, the pair of depressions being located adjacent to a front edge of the support, a second pair of the depressions being formed on the upper surface, the second pair of depressions being located adjacent to a rear edge of the support.]

25. A method of signaling the start of a swimming race, comprising:

providing a competitive swimming starting platform structure positioned adjacent to a pool;

providing a light on the starting platform structure in a location in the view of a person standing on the starting platform structure; and illuminating the light to signal the start of a swimming race.

26. The method of claim 25 including momentarily flashing the light to indicate a start of a swimming race.

27. The method of claim 25 including providing a plurality of the starting platform structures positioned adjacent to the pool.

28. The method of claim 27 including providing each of the starting platform structures with a light.

29. The method of claim 28 including illuminating the lights for each of the platforms simultaneously.

* * * * *